US006858562B1

(12) United States Patent
Takasu et al.

(10) Patent No.: US 6,858,562 B1
(45) Date of Patent: Feb. 22, 2005

(54) CATALYST FOR DECOMPOSING ORGANIC HARMFUL SUBSTANCES AND METHOD FOR DECOMPOSING ORGANIC HALIDES BY USE THEREOF

(75) Inventors: Isao Takasu, Hokkaido (JP); Kenji Fujita, Tokyo (JP)

(73) Assignees: Mitsui Chemicals, Inc., Tokyo (JP); UBE Industries, Ltd., Ube (JP)

( * ) Notice: Subject to any disclaimer, the term of this patent is extended or adjusted under 35 U.S.C. 154(b) by 92 days.

(21) Appl. No.: 10/089,302

(22) PCT Filed: Sep. 27, 2000

(86) PCT No.: PCT/JP00/06635

§ 371 (c)(1), (2), (4) Date: Mar. 29, 2002

(87) PCT Pub. No.: WO01/23086

PCT Pub. Date: Apr. 5, 2001

(30) Foreign Application Priority Data

Sep. 29, 1999 (JP) .......................................... 11-276217

(51) Int. Cl.[7] ......................... B01J 27/053; B01J 23/00; C01B 17/96; A62D 3/00

(52) U.S. Cl. ....................... 502/217; 502/305; 502/308; 502/309; 502/311; 423/544; 423/548; 423/554; 423/559; 423/593; 423/595; 423/598; 423/606; 423/608; 423/610; 423/619; 588/205; 588/206; 588/207; 588/248

(58) Field of Search ................................ 502/217, 305, 502/308, 309, 311; 423/544, 548, 554, 559, 593, 595, 598, 606, 608, 610, 619; 588/205–207, 248

(56) References Cited

U.S. PATENT DOCUMENTS 4,225,462 A * 9/1980 Umemura et al. .......... 252/440
4,378,338 A * 3/1983 Imanari et al. ............. 423/239
4,466,947 A * 8/1984 Imanari et al. ............. 423/239
5,292,704 A 3/1994 Lester

FOREIGN PATENT DOCUMENTS

| | | | |
|---|---|---|---|
| JP | 55-18245 | 2/1980 | |
| JP | 59-59249 | 4/1984 | |
| JP | 61-204040 A | 9/1986 | |
| JP | 2001-162170 * | 6/2001 | .......... B01J/27/053 |

OTHER PUBLICATIONS

Verified English translation of JP 61–204040 published Sep. 10, 1986.

* cited by examiner

*Primary Examiner*—Mark L. Bell
*Assistant Examiner*—Patricia L. Hailey
(74) *Attorney, Agent, or Firm*—Burns, Doane, Swecker & Mathis, LLP

(57) ABSTRACT

A catalyst of a water insoluble vanadyl sulfate or a complex catalyst, in which a specific oxide and a specific sulfate are combined to the water insoluble vanadyl sulfate are excellent not only in their activity, durability and $SO_2$ resistance, not only in substantially no oxidization of $SO_2$ to $SO_3$ as in HCl resistant. Therefore, using this catalyst, a decomposition treatment of an organic halide(s) can be carried out with high efficiency and good stability. In particular, a efficient decomposition treatment of an organic halides(s) can be carried out also in the cases that dust is coexist; the gas to be treated contains $SO_X$ or HCl; or they generate in the decomposition area.

39 Claims, No Drawings

CATALYST FOR DECOMPOSING ORGANIC HARMFUL SUBSTANCES AND METHOD FOR DECOMPOSING ORGANIC HALIDES BY USE THEREOF

CROSS-REFERENCE TO RELATED APPLICATIONS

This application is a 371 of Japanese PCT Application No. JP00/00635, filed on Sep. 27, 2000.

TECHNICAL FIELD

The present invention relates to a catalyst for decomposing organic harmful substances such as organic halides. More specifically, the present invention relates to a catalyst for decomposing harmful organic halides including dioxins in an exhaust gas generated with burning of urban garbage or industrial waste; or a treatment of plastic materials to make them harmless.

BACKGROUND ART

It has been revealed recently that organic harmful substances such as organic halides including dioxins and aromatic chlorides, which are considered to be their precursors, are contained in the gases which were exhausted from the incinerators for burning out urban garbage and industrial waste or the facilities for gasifying and fusing of the urban garbage and industrial waste. In addition, it is pointed out that organic harmful substances including bromodioxins and polybromodioxins are contained in the exhaust gases through thermal treatment of plastic materials used in home electric appliances waste. Regarding the organic halides, although each of the compounds have different toxicities, they are strongly toxic in general, and in particular dioxins are considered to be deadly poisonous which can strikingly affect the human body, animals and plants by causing deformity or disturbing effects of hormones.

Therefore, the pollution of the environment becomes now a social problem and reduction of the content of organic halides in the exhaust gases from the burning treatment has been urgently required. At present, as removing methods of organic halides including dioxins, various methods such as absorption method using an activated carbon, a thermolysis method or a contact decomposing method using a catalyst are proposed. Among them, the contact decomposing method has excellent characteristics in that it can avoid resynthesis of dioxins because the dioxins can be decomposed under a lower temperature condition below 300° C.; and that, since it does not require the secondary treatment which is required in the absorption method and the like, the running cost is low.

As a catalyst used in the above described contact decomposing method, various metal oxides such as vanadium pentaoxide and titanium dioxide; carbonates; and silicates are known as described in Japanese Patent Publication No. 38863/94. They are, however, not practical, because they require a high temperature for decomposition and long residence time from several minutes to several hours. Vanadium pentaoxide-titanium dioxide catalysts are disclosed in Japanese Patent Laid-Open No. 144117/31 and Japanese Patent Laid-Open No. 117557/96. However, when $SO_2$ is included in the gas to be treated or when $SO_2$ generates through the decomposition treatment, the oxidation activity of $SO_2$ become higher in the use of the catalysts containing vanadium pentaoxide. As a result, there is a problem that a large amount of $SO_3$ is produced when these catalysts are applied for purification of the exhaust gases containing $SO_X$ besides $No_X$.

There is the other problem that reduction of the catalytic activity occurs according to the time progress in their uses. The following reasons for this activity reduction can be mentioned:

1. Regarding the method of reducing a substance to be treated in the presence of a catalyst by using ammonia as a reducing agent, the catalytic activity decreases by accumulation of ammonium salts of sulfur such as ammonium bisulfate on the catalyst surface, which is formed by reaction of ammonia and $SO_3$ generated as above.

2. There is a further problem that since the oxidizing activity of $SO_2$ increases, vanadium pentaoxide is reduced and transferred to a water-soluble vanadyl sulfate ($VOSO_4$ having α type crystals: α-$VOSO_4$) and, thus, the catalytic activity is reduced according to the time progress in their uses.

3. When chlorides such as HCl and $Cl_2$ including chlorine gas are included in the gas to be treated or when they are generated through the decomposition process, change in the quality occurs and the catalytic activity are reduced.

To solve these problems, the catalyst in which tin dioxide is contained in the vanadium pentaoxide-titanium dioxide type catalyst as described in Japanese Patent Laid-Open No. 318,135/96, and the catalyst containing molybdenium trioxide as described in Japanese Patent Laid-Open No. 117, 557/96 are proposed. Further, Japanese Patent Laid-Open No. 386/94, U.S. Pat. No. 5,227,356 and German Patent No. 4,419,974 disclose a catalyst in which alkaline metal sulfates such as barium sulfate are added to vanadium pentaoxide-titanium dioxide. In addition, Japanese Patent Publication No. 2,633,316 discloses a vanadium pentaoxide-titanium dioxide-tungsten trioxide catalyst, which has resistance to impurities such as nitrogen oxides, sulfur oxides and heavy metals contained in a burning exhaust gas. Furthermore, Japanese Patent Laid-Open No. 192,455/97 discloses a catalyst in which the other component is further added to vanadium pentaoxide and titanium dioxide.

However, there has been a case where the catalysts containing vanadium pentaoxide as the main active component may be insufficient in their performances yet in resistance against HCl or $SO_X$, and, therefore, a catalyst of a higher activity and durability, which can be provided in a lower cost, has been required.

DISCLOSURE OF THE INVENTION

An object of the present invention is to provide a catalyst in a low cost, by which higher activity and durability can be obtained in a treatment of purifying a gas including an organic halide(s) such as dioxin(s) as described above. The other object of the present invention is to provide a method of decomposing an organic halide(s) using this catalyst in an excellent efficiency.

An embodiment of the catalyst for decomposition of an organic compound(s) according to the present invention is characterized in comprising a water-insoluble vanadyl sulfate. Another embodiment of the catalyst for decomposition of an organic compound(s) according to the present invention is characterized in comprising at least one oxide comprising an atom(s) selected from the group consisting of titanium, zirconium, niobium, molybdenum, tungsten and chromium; at least one sulfate comprising an atom(s) selected from the group consisting of alkaline earth metals and lead; and a water insoluble vanadyl sulfate.

A method of decomposing an organic halide(s) according to the present invention is characterized in comprising the step of contacting the above catalyst with the organic halide(s).

According to the present invention, a catalyst suitable for a purification treatment of a gas containing an organic halide(s) and a method of decomposing an organic halide(s) using the catalyst can be provided. The catalyst has durability against HCl or $SO_X$, and can be produced in a low cost, whereby a higher decomposition activity can be obtained.

BEST MODE FOR CARRYING OUT THE INVENTION

The catalyst according to the present invention comprises at least a water-insoluble vanadyl sulfate.

This vanadyl sulfate (vanadyl sulfate having β type crystals: β-$VOSO_4$) is that which per se can be obtained as a crystal having bluish green color. An infrared spectrum provides characteristic peaks at 940 $cm^{-1}$ and 510 $cm^{-1}$, respectively, which are not observed in that of the water-soluble vanadyl sulfate (vanadyl sulfate having a type crystals: α-$VOSO_4$). According to the present invention, a solid vanadyl sulfate containing at least β-$VOSO_4$ is used. Elution rate in contacting the solid with water is 10% or less than 10%, preferably 5% or less than 5%.

The water-insoluble vanadyl sulfate can be, for example, produced by the following methods:

1. A method comprising adding a reducing agent to vanadium compound of pentavalence in the presence of water to reduce its valence to that less than 5; forming precipitate from a solution obtained by addition of an ammonium salt of sulfuric acid; and calcining the precipitate after drying.

An alternative method comprising forming precipitate from a solution obtained by addition of an ammonium salt of sulfuric acid to a vanadium compound having valence less than 5; and calcining the precipitate after drying.

2. A method comprising adding an ammonium salt of sulfuric acid to vanadyl oxalate and calcining.
3. A method comprising directly calcining vanadyl sulfate.

When a carrier such as silica, alumina, activated carbon and the like, a water insoluble vanadyl in a state where it is immobilized on a carrier can be obtained by impregnating a solution for forming vanadyl sulfate into the carrier and calcining it. Examples of this solution includes the aqueous solutions before the calcination in the above methods 1 to 3, i.e., an aqueous solution prepared by using a vanadium compound of pentavalence, a reducing substance and an ammonium salt of sulfuric acid; an aqueous solution prepared by using a vanadium compound of a valence less than 5 and an ammonium salt of sulfuric acid; an aqueous solution prepared obtained by using vanadyl oxalate and an ammonium salt of sulfuric acid; and an aqueous solution of vanadyl sulfate.

As the vanadium compound of pentavalence, at least one compound selected from ammonium metavanadate, metavanadic acid, vanadium pentaoxide can be used. Further, as the vanadium compound having a valence less than 5, for example, at least one of vanadium dioxide and vanadium trioxide can be used. Among them, it is the most preferable thing to select ammonium metavanadate as the starting material in the viewpoint of reproducibility of the catalytic effect.

As the reducing agent used in the above method 1, for example, at least one of organic carboxylic acids such as oxalic acid, citric acid and tartaric acid is preferably used.

The water insoluble vanadyl sulfate comprises at least β type crystals (β-$VOSO_4$) and is characterized in that it is not dissolved in water and that the vanadium atom under the quadrivalent state has the activity for the decomposition. In this point, this is basically different from the conventional vanadium pentaoxide in the type of the active component, i.e., vanadium atom has the activity under the pentavalent state. In addition, since the catalyst is water insoluble, it has HCl resistance, and, since it is a sulfate, it has further $SO_X$ resistance.

Examples of the ammonium sulfate used in the above methods 1 and 2 include ammonium bisulfate, ammonium sulfite, ammonium sulfate and ammonium persulfate. Among them, ammonium sulfate is preferably because it is inexpensive and it enables to prepare the catalyst to be obtained more easily.

This water insoluble vanadyl sulfate can be used alone as a catalyst for decomposition of an organic compound(s), in particular an organic halide(s).

A complex catalyst can be alternatively obtained by combining this water insoluble vanadyl sulfate with an oxide(s) and a sulfate(s).

This complex catalyst can be obtained the methods such as the following ones:

A. A method comprising mixing the water insoluble vanadyl sulfate, an oxide(s) and a sulfate(s).

B. A method comprising impregnating an aqueous solution for preparation of the water insoluble vanadyl sulfate into a solid mixture of an oxide (s) and a sulfate (s); and calcining the mixture after drying.

C. A method comprising adding an oxide (s) and a sulfate (s) into an aqueous solution for preparation of the vanadyl sulfate to obtain a slurry; and calcining the slurry thus obtained after drying.

As the aqueous solutions for preparation of the water insoluble vanadyl sulfate used in the methods B and C, the aqueous solutions before calcining in the above methods 1 to 3, i.e., an aqueous solution prepared by using a vanadium compound having pentavalence, a reducing substance and an ammonium salt of sulfuric acid; an aqueous solution prepared by using a vanadium compound having a valence less than 5 and an ammonium salt of sulfuric acid; an aqueous solution prepared by using vanadyl oxalate and an ammonium salt of sulfuric acid; and an aqueous solution of vanadyl sulfate, and the like.

As the oxide, which is combined with the water insoluble vanadyl sulfate, for example, at least one of the oxides, which have one atom(s) selected from the group consisting titanium, zirconium, niobium, molybdenium, tungsten and chromium, can be used. Among them, niobium pentaoxide and titanium dioxide are useful and the most preferable one is titanium dioxide.

As a method of producing titanium dioxide, the ordinary method such as the sulfate method or the chloride method can be mentioned. Titanium dioxide can be also obtained by calcining the intermediate(s) such as metatitanic acid obtained in the production process of these methods. As the crystalline type of titanium dioxide, although either the anatase-type or rutile-type may be used, the anatase-type is more preferable.

The other oxides may be produced by an ordinary method such as the nitrate method, the sulfate method and the chloride method.

It is considered to plan by using such oxide(s) to further improve resistance against HCl and $SO_X$, as well as the activity based on high dispersion of the vanadyl sulfate as the active component in the catalyst.

As the above sulfate combined with the water insoluble vanadyl sulfate, one or more sulfates selected from sulfates of alkaline earth metals and lead sulfate can be used. As the alkaline earth metals, calcium, barium, strontium or magnesium can be used. Among them, barium is most preferable. Although the production method of barium sulfate is not limited, those produced by the precipitation method and baryta powder obtained by grinding baryta in a machine, for example, may be used. It is considered to plan by this combination of this sulfate to further improve strength of the catalyst formed in a from, and resistance against $SO_X$.

As the composite ratio of the above three components, that of the water insoluble vanadyl sulfate may be selected from the range of 0.5 to 100 wt. %, preferably 1 to 30 wt. %, especially preferably 5 to 20 wt. %; that of the oxide(s) may be selected from the range of 0 to 70 wt. %, preferably 20 to 50 wt. %: that of the sulfate(s) may be selected from the range of 0 to 70 wt. %, preferably 20 to 50 wt. %.

The temperature for calcining to form the water insoluble vanadyl sulfate may be that at which the insoluble vanadyl sulfate can be made. There is a tendency that calcination at a lower temperature results in decline of convert efficiency into the water insoluble vanadyl sulfate, while calcination at a higher temperature results in decomposition of the water insoluble vanadyl sulfate thus formed. Therefore, the calcination temperature may be selected from the range from 250° C. to 500° C., preferably 300° C. to 450° C.

As noted above, according to the catalyst of the present invention, the water insoluble vanadyl sulfate alone may be used, in the condition where it can be optionally carried on a publicly-known carrier; and a complex catalyst by combination of the above specific oxide(s) and sulfate(s) with the water insoluble vanadyl sulfate may be used, in a condition where it may be optionally carried on a publicly-known carrier. Excellent properties such as the catalytic activity, durability and forming property can be further obtained by forming such complex catalyst.

The catalyst may be used in a desired shape for decomposition reaction. For example, it may be used in a form such as pellet, sphere, granule, plate, honeycomb or three-dimensional net forms. The size as the pellet form, for example, its diameter may be from 1 mm to 50 mm and its length may be 5 mm to 60 mm. The diameter in the sphere form may be for example in the range 1 mm to 50 mm. The size in the granule form may be from 1 to 40 mesh. When it is formed in a plate, honeycomb or three-dimensional net form, more preferable effects can be obtained by forming it in a size so that its cell number per one inch-square can reach to from 5 to 400.

Such forms can be obtained, for example, by forming a precursor of the catalyst before calcining; or a catalyst powder after calcining according to an ordinary method. When the oxide(s) and the sulfate(s) are used as a carrier for forming and the water insoluble vanadyl sulfate is carried on this carrier, a complex catalyst in a desired shape can be obtained by forming the carrier per se in the desired form.

When it is necessary to reinforce the mechanical strength of the catalyst depending on its shape, an additive(s) such as whisker, fibers, clay or binders, which has used for catalyst formation, may be used optionally if required. When the catalyst is coated on a desired carrier of the desired shape such as sphere, plate or honeycomb, or when the catalyst is baked for calcination on such carrier, the catalyst of the desired shape can be obtained by forming the carrier per se in the desired form.

The smaller size (when the pellet, sphere or granule form is used) and the greater cell number (when the plate, honeycomb or three-dimensional net form) are preferable, because the total surfaces become greater. Regarding the cases that pressure loss of the gas to be conducted becomes greater and that blocking by dust can easily occur, the above sizes are preferable.

The target to be decomposed can be efficiently decomposed by contacting the catalyst obtained as noted above with a gas including an organic halide(s) as the target to be decomposed. As this gas including the organic halide(s), exhaust gases by incinerating garbage or burning industrial waste can be mentioned.

Examples of the organic halide(s) as the substances to be decomposed include organic chlorine hydrocarbons and organic bromine hydrocarbons. The organic chlorine hydrocarbons include chlorodioxins and polychlorodioxins; polychlorobiphenyls; chloroalkanes and polychloroalkanes such as chlorobenzene, dichlorobenzene, chlorotoluene, chlorophenol and chloromethane; chloroalkenes and polychloroalkenes such as chloroethylene. The organic bromine hydrocarbons include bromodioxins and polybromodioxins; polybromobiphenyls; bromoalkanes and polybromoalkanes such as bromobenzene, dibromobenzene, bromotoluene, bromophenol, polybromobiphenyl ether, bromomethane; bromoalkenes and polybromoalkenes such as bromoethylene. The catalyst according to the present invention can be effectively used against a gas comprising at least one compound of the above compounds.

The temperature for the contact of the catalyst and the substance to be treated is preferably in the range from 140° C. to 300° C. When the reaction temperature is lower than 140° C., there is a case that the activity becomes lower owing to high absorption of the organic halide(s). When the temperature is higher than 300° C., there is a case that resynthesis of dioxins can occur from the decomposition products in the dioxin decomposition.

Regarding the activity and the cost for decomposition treatment, the space velocity may be selected from the range of 1,000 to 20,000 $h^{-1}$ to obtain preferable effects. Further, the most preferable one is in the range from 2,000 to 7,000 $h^{-1}$.

The decomposition treatment can be carried out at an oxygen concentration in the range from 1 to 99%, preferably from 5 to 30%.

Since the catalyst according to the present invention has an excellent resistance against $SO_X$, it is especially suitable in the case when the gas to be treated includes $SO_X$ (x=1.5 to 3.0, for example) per se, or components which generate $SO_X$ during the heating treatment for decomposition.

As the equipments for decomposition using the catalyst according to the present invention, those having a structure may be used, which comprises a decomposition area capable of maintaining the catalyst; a means for introducing a gas to be treated into the decomposition area; a means for contacting the gas thus introduced with the catalyst; a means for exhausting a gas including the decomposition products thus formed by the action of the catalyst from the decomposition area. The exhaust gas after the decomposition treatment may be optionally subjected to various treatments if required.

Since the catalysts of the present invention hold excellent activity and durability, a continuous operation for long time can be carried out and the decomposition efficiency can be greatly improved.

EXAMPLES

Hereinafter, although the present invention will be more specifically described by Examples and Comparative Examples, the present invention is not limited to them.

Examples 1 to 21 and Comparative Examples 1 to 22

Examples for Catalyst Production (Catalyst A)

Ammonium metavanadate (50 g) was added to water to dissolve it by heating at 80° C. and 125 g of oxalic acid was added under stirring to reduce vanadium. Then, 57 g of ammonium sulfate was added into this solution containing vanadium and 510 g of the anatase-type of titanium dioxide and 260 g of barium sulfate were added one by one. The obtained slurry solution was dried with a spray dry to give powder. A small amount of water was added to the obtained powder and the mixture was kneaded and molded by extruding in pellets of 3 mm ϕ and 3 mm in length by an extruder. After drying the obtained pellets again, these were baked at 430° C. to obtain the catalyst A comprising 9 wt. % of a water-insoluble vanadyl sulfate (β-$VOSO_4$), 59 wt. % of titanium dioxide and 32 wt. % of barium sulfate.

(Catalyst B)

Catalyst B was obtained in the same manner as that for catalyst A except that the pellet size was changed to 1.6 mm ϕ and 3 mm in length.

(Catalyst C)

Catalyst C was obtained in granules of 10–20 mesh by grinding Catalyst A.

(Catalyst D)

Catalyst A was crushed and a honeycomb catalyst of the cell number of 35 per square inch was prepared by using the crushed materials thus obtained according to an ordinary method and a piece of 12 mm width and 18 cm length was cut out to obtain Catalyst D.

(Catalyst E)

Catalyst D was obtained in the same manner as that for Catalyst A except that niobium pentaoxide was used for the anatase-type of titanium dioxide. Catalyst D comprised 9 wt. % of a water-insoluble vanadyl sulfate (β-$VOSO_4$), 59 wt. % of niobium pentaoxide and 32 wt. % barium sulfate.

(Catalyst F)

Catalyst F was obtained in the same manner as that for Catalyst A except that the anatase-type of titanium dioxide and barium sulfate were not used.

(Catalyst G)

Ammonium metavanadate (100 g) was added to water to dissolve it by heating at 80° C. and 103 g of ammonium paratungstate was added under stirring to be dissolved. The anatase-type of titanium dioxide (700 g) was added to this solution to prepare the slurry solution. The obtained slurry solution was dried with a spray dry to give powder. A small amount of water was added to the obtained powder and the mixture was kneaded and molded by extruding in pellets of 3 mm ϕ and 3 mm in length by an extruder. After drying the obtained pellets again, they were baked at 500° C. to obtain the catalyst G comprising 9 wt. % of vanadium pentaoxide, 10 wt. % of tungsten trioxide and 81 wt. % of titanium dioxide.

(Catalyst H)

Catalyst H was obtained in granules by crushing Catalyst G in 10–20 mesh.

(Catalyst I)

Catalyst G was crushed and a honeycomb catalyst of the cell number of 35 per square inch was prepared by using the crushed materials according to an ordinary method and a piece of 12 mm width and 18 cm length was cut out to obtain Catalyst I.

(Catalyst J)

Ammonium metavanadate (100 g) was added to water to dissolve it by heating at 80° C. and 510 g of the anatase-type of titanium dioxide and 276 g of barium sulfate were added to this solution to prepare the slurry solution. The obtained slurry solution was dried with a spray dry to give powder. A small amount of water was added to the obtained powder and the mixture was kneaded and molded by extruding in pellets of 3 mm ϕ and 3 mm in length by an extruder. After drying the obtained pellets again, they were baked at 500° C. to obtain the catalyst J comprising 9 wt. % of vanadium pentaoxide, 59 wt. % of tungsten trioxide and 32 wt. % of titanium dioxide.

(Catalyst K)

Catalyst K was obtained in granules by crushing Catalyst J in 10–20 mesh.

(Catalyst L)

A catalyst was prepared from titanium dioxide in order to confirm whether titanium dioxide has catalytic effect. In particular, a slurry solution obtained by adding 500 g of the anatase-type of titanium dioxide to water was dried by a spray dry to obtain powder. A small amount of water was added to the obtained powder and the mixture was kneaded and molded by extruding in pellets of 3 mm ϕ and 3 mm in length by an extruder. After drying the obtained pellets again, they were baked at 430° C. to obtain the catalyst L of the anatase-type of titanium dioxide.

Test Examples

Using the above catalysts, the following tests were carried out:

1. MCB Decomposition Activity Test 1

MCB (monochlorbenzene) decomposition activity tests were carried out using catalysts A, E, F, H and J individually. A catalyst was charged in a cylindrical glass reactor of 30 mm ϕ to occupy the volume of 10 ml. A gas having a composition of 10 volume % oxygen and 90 volume % nitrogen containing 16 ppm MCB was allowed to continuously flow and the decomposition reaction was carried out at 6,000 $hr^{-1}$ of the space velocity and at a reaction temperature between 140° C. and 180° C. for 5 hours. Data by the reaction for 5 hours are shown in Table 1. The decomposition rate (%) by gas chromatographic analysis was calculated according to the equation: ((MCB concentration at the inlet)−(MCB concentration at the outlet)/(MCB concentration at the inlet)×100).

Catalysts A, E and F exhibited higher decomposition rates in comparison with Catalysts G, J and L.

TABLE 1

| | Catalyst | Reaction Temperature (° C.) | MCB Decomposition Rate (%) |
|---|---|---|---|
| Example 1 | A | 180 | 99.9 |
| Example 2 | A | 160 | 99.5 |
| Example 3 | A | 140 | 99.0 |
| Example 4 | E | 180 | 98.4 |
| Example 5 | E | 160 | 98.1 |
| Example 6 | E | 140 | 97.5 |
| Example 7 | F | 180 | 95.8 |
| Example 8 | F | 160 | 95.4 |
| Example 9 | F | 140 | 94.0 |
| Comparative Example 1 | G | 180 | 86.7 |
| Comparative Example 2 | G | 160 | 82.5 |
| Comparative Example 3 | G | 140 | 78.1 |
| Comparative Example 4 | J | 180 | 85.2 |

TABLE 1-continued

| | Catalyst | Reaction Temperature (° C.) | MCB Decomposition Rate (%) |
|---|---|---|---|
| Comparative Example 5 | J | 160 | 80.9 |
| Comparative Example 6 | J | 140 | 76.5 |
| Comparative Example 7 | L | 200 | 0.1 |
| Comparative Example 8 | L | 180 | 0.0 |

2) MCB Decomposition Activity Test 2

Catalyst D or I in the form of a honeycomb shape of 12 mm square section and 18 cm length was filled in a stainless steel (SUS) reactor having a 13 mm square section. A gas having a composition of 10 volume % oxygen and 90 volume % nitrogen containing 16 ppm MCB was allowed to continuously flow and the composition reaction was carried out for 5 hours at 7,000 $hr^{-1}$ of the space velocity and at the reaction temperature of 200° C. Data for the 5-hour reaction are exhibited in Table 2. The decomposition rate was obtained in the same manner as that in MCB decomposition activity test 1.

TABLE 2

| | Catalyst | Reaction Temperature (° C.) | MCB Decomposition Rate (%) |
|---|---|---|---|
| Example 10 | D | 200 | 90.9 |
| Comparative Example 9 | I | 200 | 80.8 |

3) Decomposition Activity Test Against DXNs

DXNs (dioxins) decomposition activity test was carried out using Catalysts A, B and G, individually. A catalyst was filled in a cylindrical SUS reactor having a 29 mm square section to occupy a volume of 60 ml. A gas having the composition of 10 volume % oxygen, 80 volume % nitrogen and 10 volume % steam containing dioxins (2378-T4CDD, 123678-H6CDD and 08CDD) so that the inlet concentration was controlled as shown in Table 3 was allowed to continuously flow and decomposition reaction was carried out at 10,000 $hr^{-1}$ of the space velocity at a temperature between 140° C. and 180° C. for 300 hours. Data during the reaction between 200 to 300 hours are shown in Table 3. The decomposition rate (%) was calculated according to the equation: ((DXNs concentration at the inlet)−(DXNs concentration at the outlet)/(DXNs concentration at the inlet)×100).

TABLE 3

| | Catalyst | Reaction Temp. (° C.) | Inlet conc. ngTEQ/ $Nm^3 \cdot h$ | Outlet Conc. ngTEQ/ $Nm^3 \cdot h$ | DXNs Decomposition Rate (%) |
|---|---|---|---|---|---|
| Example 11 | A | 160 | 12.0 | 0.177 | 98.5 |
| Example 12 | A | 140 | 12.0 | 0.202 | 98.3 |
| Example 13 | B | 140 | 12.0 | 0.032 | 99.7 |
| Comparative Example 10 | G | 180 | 9.8 | 0.739 | 92.8 |
| Comparative Example 11 | G | 160 | 9.8 | 0.911 | 90.7 |
| Comparative Example 12 | G | 140 | 9.8 | 1.20 | 87.8 |

4) Test of HCl Resistance

To confirm influence by difference of HCl amounts generated during decomposing, Catalyst C, H or K was charged in a cylindrical glass reactor of 12 mm ϕ to occupy the volume of 5 ml. Each gas composed of 10 volume % oxygen, and 90 volume % nitrogen containing 100 ppm or 16 ppm MCB was allowed to continuously flow to decompose them at 3,000 $hr^{-1}$ of the space velocity and at 180° C. of the reaction temperature to confirm a tendency of time-lapse degradation. The decomposition rate (%) was calculated in the same manner as in that of MCB decomposition activity test 1. The results thus obtained are shown in Table 4.

TABLE 4

| | MCB Concentration at the Inlet: 100 ppm | | | MCB Concentration at the Inlet: 16 ppm | | |
|---|---|---|---|---|---|---|
| Passage Time (hr.) | Example 14 Catalyst C | Comparative Example 13 Catalyst H | Comparative Example 14 Catalyst K | Example 14 Catalyst C | Comparative Example 15 Catalyst H | Comparative Example 16 Catalyst K |
| 1 | 99.3 (99.3) | 16.0 (16.0) | 34.5 (34.5) | 99.7 (16.0) | 85.2 (13.6) | 86.5 (13.8) |
| 25 | 94.3 (94.3) | 49.0 (49.0) | 51.1 (51.1) | 99.9 (16.0) | 84.2 (13.5) | 85.9 (13.7) |
| 50 | 92.0 (92.0) | 52.9 (52.9) | 53.2 (53.2) | 99.8 (16.0) | 83.8 (13.5) | 85.2 (13.6) |
| 76 | 91.1 (91.1) | 52.3 (52.3) | 53.5 (53.5) | 99.8 (16.0) | 83.6 (13.4) | 84.8 (13.6) |
| 100 | 91.4 (91.4) | 46.9 (46.9) | 52.9 (52.9) | 99.4 (15.9) | 83.1 (13.3) | 84.6 (13.5) |
| 125 | 90.8 (90.8) | 50.2 (50.2) | 53.7 (53.7) | — | — | — |
| 150 | 91.0 (91.0) | 52.3 (52.3) | 53.9 (53.9) | — | — | — |
| 175 | 90.6 (90.6) | 50.9 (50.9) | 53.5 (53.5) | — | — | — |

The number in each pair of the blackest means the HCl amount thus formed (ppm) based on the MCB decomposition.

5) Oxidation Activity Test on $SO_2$

Catalyst A, G or J was charged in a cylindrical glass reactor of 30 mm ϕ to occupy a volume of 10 ml. A gas has a composition of 10 volume % oxygen, 79.9 volume % nitrogen and 10 volume % steam containing 0.1 volume % sulfur dioxide was allowed to continuously flow and their reaction was carried out at 5,000 $hr^{-1}$ of the space velocity at a reaction tempeature between 140° C. to 180° C. for 5 hours. Data after 5 hours are shown in Table 5. The oxidation rate (%) of sulfur dioxide was calculated by the equation, (($SO_2$ concentration at the inlet)−($SO_2$ concentration at the outlet)/($SO_2$ concentration at the inlet)×100).

TABLE 5

| | Catalyst | Reaction Temperature (° C.) | Oxidation Rate of $SO_2$ (%) |
|---|---|---|---|
| Example 16 | A | 180 | 0.4 |
| Example 17 | A | 160 | 0.0 |
| Example 18 | A | 140 | 0.0 |
| Comparative Example 17 | G | 180 | 2.5 |
| Comparative Example 18 | G | 160 | 1.6 |
| Comparative Example 19 | G | 140 | 1.2 |
| Comparative Example 20 | J | 180 | 3.3 |
| Comparative | J | 160 | 2.4 |

TABLE 5-continued

| | Catalyst | Reaction Temperature (° C.) | Oxidation Rate of $SO_2$ (%) |
|---|---|---|---|
| Example 21 Comparative Example 22 | J | 140 | 1.8 |

6) Decomposition Activity Test on Bromobenzene

Catalyst A or G was charged in a cylindrical glass reactor of 30 mm ϕ to occupy a volume of 10 ml. A gas having a composition of 10 volume % oxygen and 90 volume % nitrogen containing 16 ppm bromobenzene (MBB) was allowed to flow and data after 5 hours at 6,000 $hr^{-1}$ of the space velocity at a reaction temperature between 140° C. to 160° C. are shown in Table 6. The oxidation rate (%) of MBB was calculated according to the equation, ((MBB concentration at the inlet)−(MBB concentration at the outlet)/(MBB concentration at the inlet)×100.

TABLE 6

| | Catalyst | Reaction Temperature (° C.) | Decomposition Rate of MBB (%) |
|---|---|---|---|
| Example 19 | A | 180 | 98.8 |
| Example 20 | A | 160 | 98.5 |
| Example 21 | A | 140 | 98.1 |
| Comparative Example 23 | G | 180 | 85.5 |
| Comparative Example 24 | G | 160 | 80.8 |
| Comparative Example 25 | G | 140 | 77.2 |

INDUSTRIAL APPLICABILITY

According to the present invention, a catalyst can be provided at a low cost by which a higher activity and durability of the catalyst can be obtained in the purification method of a gas containing an organic chlorine compound(s) such as dioxin(s) as noted above. Further, according to the present invention, a method of decomposing an organic halide(s) in a high efficient by using the catalyst.

In particular, the catalyst according to the present invention is excellent not only in its activity, durability and $SO_2$ resistance for decomposition of an organic halide(s), but also in substantially no oxidization of $SO_2$ to $SO_3$ as well as in that it is HCl resistant. Therefore, it is suitably used for highly efficient decomposition of the organic halides(s) in the cases that dust is coexist; the gas to be treated contains $SO_X$ or HCl; or they generate in the decomposition area.

What is claimed is:

1. A catalyst for decomposing an organic halide(s) comprising:

(a) 5 to 30 wt. % of a water-insoluble vanadyl sulfate (β-VOSO4);

(b) 20 to 70 wt. % of at least one oxide comprising one of titanium and niobium; and (c) 20 to 70 wt. % of at least one sulfate comprising at least one atom selected from the group consisting of calcium, barium, strontium, and lead, where (a)+(b)+(c)=100 wt. %.

2. A catalyst as claimed in claim 1 wherein the oxide is titanium dioxide.

3. A method of decomposing organic halide(s) in a gas characterized by contacting a gas containing an organic halide(s) with the catalyst described in claim 2 to decompose the organic halide(s).

4. A catalyst as claimed in claim 2, wherein the titanium oxide is an anatase-type titanium oxide.

5. A catalyst as claimed in claim 1 wherein the sulfate is barium sulfate.

6. A method of decomposing organic halide(s) in a gas characterized by contacting a gas containing an organic halide(s) with the catalyst described in claim 5 to decompose the organic halide(s).

7. A catalyst as claimed in claim 1 wherein the organic halide(s) is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

8. A catalyst as claimed in claim 7 wherein the organic halide(s) is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

9. A method of decomposing organic halide(s) in a gas comprising contacting a gas containing an organic halide(s) with the catalyst described in claim 1 to decompose the organic halide(s).

10. A method of decomposing as claimed in claim 9 wherein the contact between the organic halide(s) and the catalyst is carried out at a temperature from 140 to 300° C.

11. A method of decomposing as claimed in claim 9 wherein the organic halide(s) is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

12. A method of decomposing as claimed in claim 11 wherein the organic halide(s) is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

13. A method of decomposing at least one organic halide, comprising contacting a gas containing at least one organic halide with a catalyst comprising water-insoluble vanadyl sulfate (β-VOSO4).

14. A method of decomposing as claimed in claim 13 wherein the catalyst further comprises at least one oxide comprising at least one atom selected from the group consisting of titanium, zirconium, niobium, molybdenum, tungsten and chromium; and at least one sulfate comprising at least one atom selected from the group consisting of alkaline earth metals and lead.

15. A method of decomposing as claimed in claim 14 wherein the catalyst comprises 0 to 70 wt. % of the oxide(s), 0 to 70 wt. % of the sulfate(s), and 0.5 to 100 wt. % of the water-insoluble vanadyl sulfate.

16. A method of decomposing as claimed in claim 15 wherein the oxide is titanium dioxide.

17. A method of decomposing as claimed in claim 16 wherein the sulfate is barium sulfate.

18. A method of decomposing as claimed in claim 17 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

19. A method of decomposing as claimed in claim 18 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

20. A method of decomposing as claimed in claim 16 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

21. A method of decomposing as claimed in claim 20 wherein the at least on organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

22. A method of decomposing as claimed in claim 15 wherein the sulfate is barium sulfate.

23. A method of decomposing as claimed in claim 22 wherein the at least one organic halide is at least one of chlorodioxins and polychlorodioxins; polychlorobiphenyls; chloroalkenes and polychloroalkanes; chloroalkenes and polychloroalkenes; bromodioxins and polybromodioxins; polybromobiphenyls; bromoalkanes and polybromoalkanes; and bromoalkenes and polybromoalkenes.

24. A method of decomposing as claimed in claim 23 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

25. A method of decomposing as claimed in claim 15 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

26. A method of decomposing as claimed in claim 25 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

27. A method of decomposing as claimed in claim 14 wherein the oxide is titanium dioxide.

28. A method of decomposing as claimed in claim 27 wherein the sulfate is barium sulfate.

29. A method of decomposing as claimed in claim 28 wherein the at least one organic halide is at least one of chlorodioxins and polychlorodioxins; polychlorobiphenyls; chloroalkanes and polychloroalkanes; chloroalkenes and polychloroalkenes: bromodioxins and polybromodioxins; polybromobiphenyls; bromoalkanes and polybromoalkanes; and bromoalkenes and polybromoalkenes.

30. A method of decomposing as claimed in claim 29 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

31. A method of decomposing as claimed in claim 27 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls: bromoalkanes and polybromoalkanes; and bromoalkenes and polybromoalkenes.

32. A method of decomposing as claimed in claim 31 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

33. A method of decomposing as claimed in claim 14 wherein the sulfate is barium sulfate.

34. A method of decomposing as claimed in claim 33 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

35. A method of decomposing as claimed in claim 34 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

36. A method of decomposing as claimed in claim 14 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

37. A method of decomposing as claimed in claim 36 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

38. A method of decomposing as claimed in claim 13 wherein the at least one organic halide is at least one of chlorodioxins and polychlorodioxins; polychlorobiphenyls; chloroalkanes and polychloroalkanes; chloroalkenes and polychloroalkenes; bromodioxins and polybromodioxins; polybromobiphenyls; bromoalkanes and polybromoalkanes; and bromoalkenes and polybromoalkenes.

39. A method of decomposing as claimed in claim 38 wherein the at least one organic halide is at least one of chlorodioxins and polychlorodioxins, polychlorobiphenyls, chlorobenzene, dichlorobenzene, chlorotoluene, chlorophenol, chloromethane, chloroethylene, bromodioxins and polybromodioxins, polybromobiphenyls, bromobenzene, dibromobenzene, bromotoluene, bromophenol, polybromobiphenyl ether, bromomethane and bromoethylene.

* * * * *